(12) United States Patent
Akkiraju et al.

(10) Patent No.: US 8,495,559 B2
(45) Date of Patent: Jul. 23, 2013

(54) EXTRACTING PLATFORM INDEPENDENT MODELS FROM COMPOSITE APPLICATIONS

(75) Inventors: Rama Kalyani T. Akkiraju, San Jose, CA (US); Tilak Mitra, Coconut Creek, FL (US); Usha Thulasiram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 12/206,950

(22) Filed: Sep. 9, 2008

(65) Prior Publication Data
US 2010/0064275 A1    Mar. 11, 2010

(51) Int. Cl.
*G06F 9/44*   (2006.01)
*G06F 9/45*   (2006.01)

(52) U.S. Cl.
USPC .............................. 717/104; 717/106; 717/136

(58) Field of Classification Search
None
See application file for complete search history.

(56) References Cited

U.S. PATENT DOCUMENTS

| | | | |
|---|---|---|---|
| 8,027,948 B2* | 9/2011 | Akkiraju et al. | 706/55 |
| 8,127,270 B1 | 2/2012 | Jerman et al. | |
| 8,141,069 B2* | 3/2012 | Koehler | 717/106 |
| 2002/0147606 A1 | 10/2002 | Hoffmann et al. | |
| 2004/0249645 A1 | 12/2004 | Hauser et al. | |
| 2005/0080609 A1 | 4/2005 | Bhaskaran et al. | |
| 2005/0080640 A1 | 4/2005 | Bhaskaran et al. | |
| 2006/0064667 A1* | 3/2006 | Freitas | 717/104 |
| 2006/0106626 A1 | 5/2006 | Jeng et al. | |
| 2006/0130008 A1 | 6/2006 | Nguyen et al. | |
| 2006/0130009 A1* | 6/2006 | Cornell et al. | 717/136 |
| 2006/0130011 A1* | 6/2006 | Cornell et al. | 717/136 |
| 2006/0242195 A1 | 10/2006 | Bove et al. | |
| 2007/0006135 A1* | 1/2007 | Kraemer | 717/105 |
| 2007/0118551 A1* | 5/2007 | Akkiraju et al. | 707/102 |
| 2007/0226681 A1* | 9/2007 | Thorup | 717/104 |
| 2007/0288222 A1* | 12/2007 | Eilam et al. | 703/22 |
| 2007/0288286 A1* | 12/2007 | Linehan | 705/9 |
| 2008/0229276 A1* | 9/2008 | Koehler et al. | 717/104 |
| 2008/0276229 A1* | 11/2008 | Hawkins et al. | 717/136 |
| 2009/0150854 A1* | 6/2009 | Elaasar et al. | 717/104 |

(Continued)

OTHER PUBLICATIONS

Tushar K. Hazra, "MDA brings standards-based modeling to EAI teams", May 1, 2002, adtmag.com, pp. 1-5 <http://adtmag.com/articles/2002/05/01/mda-brings-standardsbased-modeling-to-eai-teams.aspx>.*

(Continued)

*Primary Examiner* — Thuy Dao
*Assistant Examiner* — Ben C Wang
(74) *Attorney, Agent, or Firm* — Cantor Colburn LLP; William Stock

(57) ABSTRACT

A system and method for extracting a platform independent model (PIM) from the existing implementation artifacts of a composite application via an intermediary platform specific model (PSM) using model-driven transformations. Metamodels for the PSM and PIM are prepared and mapping rules are specified therebetween. The mapping rules can be created manually or derived automatically via ontology mapping techniques. Once specified, model driven transformations that codify the mapping rules generate the PIM which may include the structural, behavioral and user experience models of the composite application. To enhance the reusability of the extracted PIM, a business level service model along with a service dependency model is generated rather than IT level classes. These higher levels of abstraction enable the models to be linked with business objectives, which is important for companies to understand and maintain their service portfolios.

24 Claims, 13 Drawing Sheets

U.S. PATENT DOCUMENTS

| | | | | |
|---|---|---|---|---|
| 2009/0150860 | A1* | 6/2009 | Gschwind et al. | 717/104 |
| 2009/0319981 | A1* | 12/2009 | Akkiraju et al. | 717/104 |
| 2010/0077386 | A1* | 3/2010 | Akkiraju et al. | 717/136 |
| 2011/0161922 | A1* | 6/2011 | Gerken | 717/106 |
| 2012/0042299 | A1* | 2/2012 | Perrin et al. | 717/104 |
| 2012/0110545 | A1* | 5/2012 | Jerman et al. | 717/104 |

OTHER PUBLICATIONS

He et al., "Constructing Platform Independent Models of Web Application", 2005 IEEE, SOSE'05, pp. 1-5 <http://ieeexplore.ieee.org/xpls/abs_all.jsp?arnumber=1551133&tag=1>.*

Arsanjani et al., "SOMA: A method for developing service-oriented solutions", Aug. 6, 2008, IBM Systems Journal, vol. 47, No. 3, pp. 377-396 <http://www.cs.jyu.fi/el/tjtse54_09/Artikkelit/ArsanjaniEtAlIBMSsJ.pdf>.*

Nguyen et al., "Agile Development of Platform Independent Model in Model driven Architecture", 2010 IEEE, pp. 344-347; <http://ieeexplore.ieee.org/stamp/stamp.jsp?tp=&arnumber=5513837>.*

Billig et al., "Platform Independent Model Transformation Based on TRIPLE", IFIP International Federation for Information Processing 2004, pp. 493-511; <http://link.springer.com/content/pdf/10.1007%2F978-3-540-30229-2_26>.*

Koehler et al., "A Model-Driven Transformation Method", 2003 IEEE, EDOC'03, pp. 1-12; <http://ieeexplore.ieee.org/stamp/stamp.jsp?tp=&arnumber=1233848>.*

Chaâbane et al., "From Platform Independent Service Composition Model in BPMN4SOA to Executable Service Compositions", 2010 ACM, iiWAS2010, Nov. 8-10, 2010, Paris, France, pp. 653-656; <http://dl.acm.org/citation.cfm?id=1967588>.*

Alexandru C. Telea, "Reverse Engineering—Recent Advances and Applications", 2012 In Tech, Croatia, pp. 1-290; <http://www.cs.rug.nl/~alext/PAPERS/InTech12/book.pdf>.*

Akkiraju et al., "Toward the Development of Cross-platform Business Applications via Model-driven Transformations", 2009 IEEE, pp. 585-592; <http://ieeexplore.ieee.org/stamp/stamp.jsp?tp=&arnumber=5190690>.*

Rožanc et al., "Producing the Platform Independent Model of an Existing Web Application", 2012 IEEE, pp. 1341-1348; <http://proceedings.fedcsis.org/2012/pliks/276.pdf>.*

Agarwal et al., "A Service Creation Environment Based on End to End Composition of Web Services", 2005 ACM, WWW 2005, May 10-14, 2005, Chiba, Japan, pp. 128-137; <http://dl.acm.org/citation.cfm?id=1060745.1060768&coll=DL&dl=GUIDE&CFID=188423796&CFTOKEN=27139582>.*

Akkiraju et al., Non-Final Office Action for U.S. Appl. No. 12/142,040 mailed on Aug. 18, 2011.

Javed et al., "Automated Generation of Test Case Using Model-driven Architecture," The Computer Society, (AST 07), IEEE, (Feb. 2007), pp. 1-7.

Fong, "Successful Implementation of Model Driven Architecture," Borland, The Open Alm Company, (Jun. 2007), pp. 1-16.

Kleppe et al., "MDA Explained: The Model Driven Architecture: Practice and Promise", Addison-Wesley Professional, (Apr. 21, 2003), Chapters 4-6, 8 and 10.

Chang Liu, Platform-Independent and Tool-Neutral Test Descriptions for Automated Software Testing, ICSE, 2000, Limerick, Ireland.

Brahim Medjahed et al., Business-to-Business Interactions: Issues and Enabling Technologies, The VLDB Journal (2003) 12: 59-85/ Digital Object Indentifier (DOI) 10.1007/s00778-003-0087-z.

Andreas Billig et al., Platform Independent Model Transformation Based on Triple, H.-A. Jacobsen (Ed.): Middleware 2004, LNCS 3231, pp. 493-511, 2004.

Jon Siegel, Ph.D., Why Use the Model Driven Architecture to Design and Build Distributed Applications?, ICSE'05, May 15-21, 2005, St. Louis Missouri, USA.

Rama Akkiraju et al., Searching Service Repositories by Combining Semantic and Ontological Matching, IBM Watson Research Center, 19 Skyline Drive, Hawthorne, NY, 2005.

Rama Akkiraju et al., SEMAPLAN: Combining Planning with Semantic Matching to Achieve Web Service Composition, IBM Watson Research Center, 19 Skyline Drive, Hawthorne, NY, American Association for Artificial Intelligence, 2005.

Fong, Choong Koon "Quick Start Guide to MDA A Primer to Model-Driven Architecture Using Borland Together Technologies" Sep. 2006, pp. 1-80.

Office Action—Final for U.S. Appl. No. 12/142,040, filed Jun. 19, 2008; First Named Inventor: Rama Kalyani T. Akkiraju; Mail Date: Feb. 16, 2012.

Non-Final Office Action dated Mar. 28, 2012 for U.S. Appl. No. 12/235,214.

Jon Seigel, "Using OMG's Model Driven Architecture (MDA) to Integrate Web Services", 2002, pp. 1-9.

Wadsack et al., "Towards Model-Driven Middleware Maintenance", 2002, 6 pages.

* cited by examiner

EXTRACTING PLATFORM INDEPENDENT MODELS FROM COMPOSITE APPLICATIONS

BACKGROUND

The present invention relates generally to the implementation of business services and, more particularly, to a system and method for extracting or generating platform independent models from composite applications.

Much has been talked about code reuse but the promise of code reuse is often hard to realize. This is so because code that is built on one platform may or may not be easily translated into another platform. If the programming language requirements are different for each platform or if the applications to be developed involve integrating with several local legacy systems, then code reuse is difficult to achieve due to the sheer nature of heterogeneity. The nuances of each platform may make code reuse difficult even if the code is built using the same programming language (e.g., JAVA®) using the same standards (such as J2EE) on the source platform as is expected on the target platform. There is a tacit acknowledgement among practitioners that model reuse is more practical than code reuse. Platform independent models (PIMs) of a given set of business solutions either developed manually or extracted through automated tools from existing solutions can provide a valuable starting point for reuse. A platform independent model of a business application is a key asset for any client for future enhancements to their business processes because it gives the client a formal description of what exists. The PIM is also a key asset for IT consulting companies as well if the consulting company intends to develop pre-built solutions in certain industries.

Model driven development and code generation from models has been discussed in the literature. In a model driven development approach, given two meta-models, i.e., a source meta-model and a target meta-model and the transformation rules that can transform the source meta-model into the target meta-model, any given platform independent model that adheres to the source meta-model can be translated into a platform specific model (PSM) that adheres to the target meta-model. The resulting PSM can then be translated into various implementation artifacts on the target platform. This is called forward engineering. By reversing this approach, platform independent models can be extracted from platform specific models and implementation artifacts.

The prior art and features in vendor tools such as the IBM Rational Software Architect (RSA) provide the method and some tooling capabilities (with several gaps) to extract models. However, most of the reverse engineering has focused on extracting the structural models (e.g., class models) from implementation artifacts. For example, if a UML model were to be derived from a piece of Java code, reverse engineering techniques have looked at deriving structural models such as classes, their data members and interfaces, etc. This approach, although it works to a degree, does not provide a high-enough level of abstraction required to maximize the reusability of the extracted platform independent model in a service-oriented architecture (SOA). For example, in a service-oriented architecture, the modular reusable abstraction is defined at the level of services rather than classes. This distinction is important because abstraction at the level of services enables one to link the business functions offered by services with business objectives—this link is important to increase the reusability of PIM models as well. The reusability of the reverse-engineered models with the current state-of-the-art is diminished by the lack of proper linkages to higher level business objectives.

BRIEF SUMMARY

In an embodiment of the invention, a method for extracting a platform independent model from a composite application includes identifying existing implementation artifacts of the composite application; transforming the identified implementation artifacts to generate a platform specific model, wherein to generate a PSM includes one or more transformations between the implementation artifacts and one or more meta-models of the PSM; and transforming the PSM to generate a PIM, wherein to generate a PIM includes one or more transformations between the one or more meta-models of the PSM and one or more meta-models of the PIM. The generated PIM may include the structural, behavioral and user experience models of the composite application. In addition, the structural models are elevated to higher-level services to enhance the reusability of the generated PIM. Furthermore, these higher levels of abstraction enable the models to be linked with business objectives. Establishing this linkage is important for companies to understand and maintain their project portfolios. The reusable PIMs, thus generated, can then be translated into implementation artifacts, possibly on a different platform, for a different client via model-driven transformations in the forward direction. This helps cut down the development time during project implementation, thereby resulting in reduced project durations and costs.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

DETAILED DESCRIPTION

Figure 1:
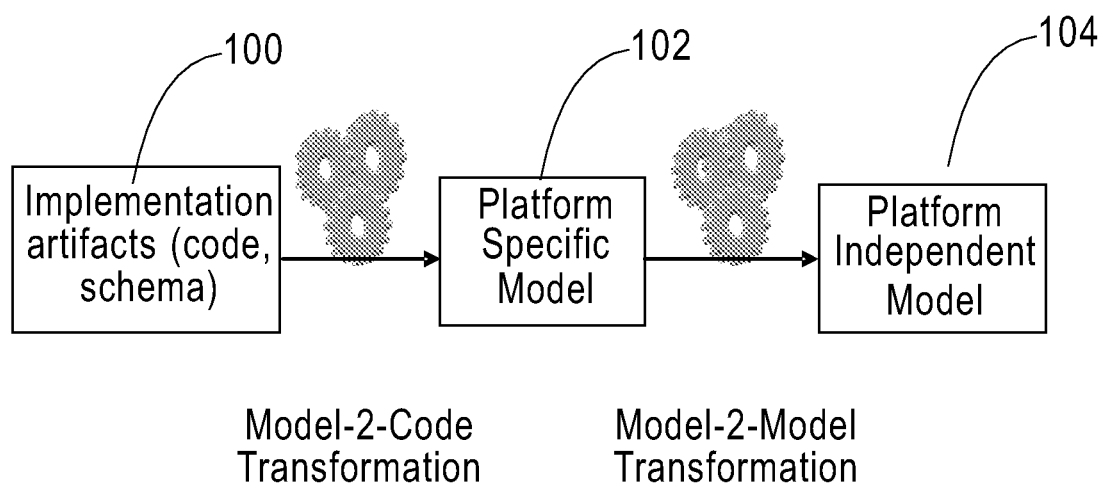
FIG. 1 is a block diagram of a method according to an embodiment of the invention for extracting a platform independent model from existing implementation artifacts of a composite application.

Disclosed herein is a system and method for extracting a platform independent model from a composite application. As used herein, "composite applications" refers to a new business application that is created by combining multiple existing functions. Also as used herein, a "platform" refers to a software middleware platform such as IBM's WebSphere®, SAP's NetWeaver®, BEA's WebLogic®, and Oracle's Fusion platforms. Briefly stated, the existing implementation artifacts of the composite application are transformed into a corresponding platform specific model. A meta-model for each of the PSM and the to-be-extracted PIM are prepared and mapping rules are specified between the two meta-models. The mapping rules can be created manually or derived automatically via ontology mapping techniques. Once specified, model driven transformations that codify the mapping rules generate the PIM. The generated PIM may include the structural, behavioral and user experience models of the composite application. To enhance the reusability of the extracted PIM, the generated structural models are further modularized into higher-level services. Novel aspects of the transformations include extracting appropriate levels/granularity of services to enhance reusability of the extracted PIM models. Furthermore, these higher levels of abstraction enable the models to be linked with business objectives. Establishing this linkage is important for companies to understand and maintain their project portfolios.

The modeling notions of the Object Management Group (OMG) are enhanced in three ways: first, a "service" is used as a first-class modeling construct instead of a "class" in building the structural models. A service is a higher-level abstraction than a class. A service exposes its interface signature, message exchanges and any associated metadata and is often more coarse-granular than a typical class in an object-oriented paradigm. This notion of working with services rather than classes enables one to think of a business application as a composition of services. This higher-level abstraction is useful when deciding which model elements need to be transformed onto the target platforms and how to leverage existing assets in a client environment. This is so because the existing assets in a client environment can be wrapped as services with their associated metadata (if any) and can be rationalized with modeled services to ensure reuse of existing assets. It is more natural to do this rationalization at the level of services and their interfaces rather than at the level of classes. Operationally, a service is a class but conceptually it offers a higher level of abstraction which enhances the reusability of a PIM.

Second, the vocabulary is defined to express the user experience modeling elements using the "service" level abstractions. Several best practice models have been suggested about user experience modeling but no specific profile is readily available for use in expressing platform independent models. Herein, a profile is created that defines the language for expressing user experience modeling elements. These include stereotypes for information elements and layout elements. Information elements include screen, input form, and action elements that invoke services on the server side (called service actions) and those that invoke services locally on the client (non-service actions). Layout elements include text, table and chart elements.

Third, the linkage between the service model interfaces and user interface elements is derived from call-graph details (FIG. 2) and is specified declaratively in the PIM model. The method supports extraction of the service model interface to user interface element mapping to be done in various formats including XML and UML. The declarative mappings make the PIM platform independent and also cleanly separate the service model from the user experience model. This allows for the service model and the user experience model to be developed independently by different users if this derived PIM were to be later changed/refined for reuse. For example, a business analyst can refine the service model even while the user experience model is refined by the user experience professional.

Model driven development (MDD) and code generation from models is known. The notion of a layered model driven architecture evolved from the OMG. In OMG's view, models expressed in a well-defined notation are cornerstones to understanding systems for enterprise-scale solutions. The Model driven architecture (MDA) approach comprises several steps apart from the model creation and transformation authoring aspects discussed above. MDA envisions model creation, analysis, transformation, composition, testing, simulation, extraction, and metadata management as important aspects of model driven development. Many commercially-available vendor tools provide support for some or all of these aspects to varying degrees. Generating implementation artifacts from models via transformations is referred to as forward engineering. Extraction of models from existing artifacts of a business application is termed reverse engineering.

Development of enterprise systems is viewed as an organization of a set of models built using a series of transformations between various levels of models. Building automated transformations between models is made possible by creating transformation (mapping) rules between the meta-models of the expressed models. Given two meta-models (e.g., a source meta-model and a target meta-model) and the transformation rules that can transform the source meta-model into the target meta-model, transformations can be built using tools offered by various tool vendors. Using these transformations, a PIM can be translated into a PSM and the PSM can then be translated into various implementation artifacts on the target platform. Other model translations are possible (e.g., PSM to PIM), as described in more detail hereinafter is accordance with an exemplary embodiment of the present invention. Extracting PIM from code and implementation artifacts is technically a much harder problem than generating code from models. The capabilities of tools in reverse engineering PIM modeling from artifacts are therefore minimal with many gaps.

Service Oriented Architecture (SOA) is a paradigm that uses a set of principles, policies, best practices, guidelines and technology capabilities to build IT systems (e.g., applications, infrastructure, etc.) that align with the business strategies and imperatives of an enterprise. In SOA, autonomous, loosely coupled and coarse-grained services with well-defined interfaces provide business functionality that can be discovered and accessed through a supportive infrastructure. This allows internal and external system integration as well as the flexible reuse of application logic through the composition of services supporting end-to-end business processes.

Different companies and schools of thoughts have developed various mechanisms and viewpoints on how to use the principles, best practices and guidelines of SOA to build well defined, consistent and complete models which are resilient to changes and adequately represent the solution to the problem domain. One such a school of thought from IBM is called Service Oriented Modeling and Architecture (SOMA). SOMA is a service oriented modeling and design technique that provides prescriptive guidance on how to develop a robust, scalable SOA solution aimed at enabling target business processes. At the heart of SOMA are the identification, specification and realization of business-aligned services that form the foundation for an SOA solution. During the identification phases, the technique applies a filtering mechanism by which it only identifies those services, from the candidate service list, that will be exposed. During the specification phase, the method provides prescriptive guidance and techniques on how to design the services—input and output messages, non-functional requirements and how to support them, dependencies of services on other services and technical components, composition of services to realize a part of or the entire business process and how services are implemented through service components, functional components and technical components. The realization phases of the method provide specific techniques to identify design and implementation decisions prescribing how to implement all the designed services to form a complete end-to-end SOA solution. In a sense, SOA enabled by the SOMA method provides higher level of abstractions during the building of platform independent models in the MDD technique. From this perspective, SOA elevates MDD to a higher level of abstraction thereby enabling the models to be linked with business objectives.

SOMA is a method for modeling and developing service-oriented IT solutions for enabling business processes. Other SOA methods operate in the same domain of modeling and building solutions. The method does not offer any mechanisms for deriving service-oriented models from implementation artifacts that are built using either service-oriented methods or other legacy. Therefore, the space of extracting PIM models from implementation artifacts in the context of service-oriented architecture is unexplored. Present innovation operates in this space.

The objective of reverse engineering activities is to generate formal models (e.g., a PIM) from the implementation artifacts (e.g., code) of a composite application. Thus, the existing implementation artifacts are the starting point for this approach. Referring to FIG. 1, there illustrated in simplified block diagram form is an exemplary embodiment of a method of the invention for extracting or generating ("reverse engineering") a platform independent model from the existing implementation artifacts. The artifacts 100 typically include code and other artifacts such as database schema and user interface pages that run on a client's existing platform environment. Code-to-model transformations transform the artifacts 100 into a platform specific model (PSM) 102. The PSM 102 is then translated into the desired platform independent model (PIM) 104 via additional model-to-model transformations. At this point a PIM 104 of a given set of artifacts 100 has been extracted. The blocks of the method illustrated in FIG. 1 are described in greater detail hereinafter.

Traditional reverse engineering techniques have looked at extracting models from the code faithfully. For example, if a UML model were to be derived from a piece of Java code, reverse engineering techniques have looked at deriving structural models such as classes, their data members and interfaces, etc. However, in a service-oriented architecture, the modular reusable abstraction is defined at the level of services, and its operations, as noted above. In an embodiment of the invention, the approach is to analyze the platform specific artifacts and derive a platform independent model at the level of service abstractions that are appropriate for reuse in an SOA environment. The specific contributions in this aspect are discussed hereinabove.

Figure 2:
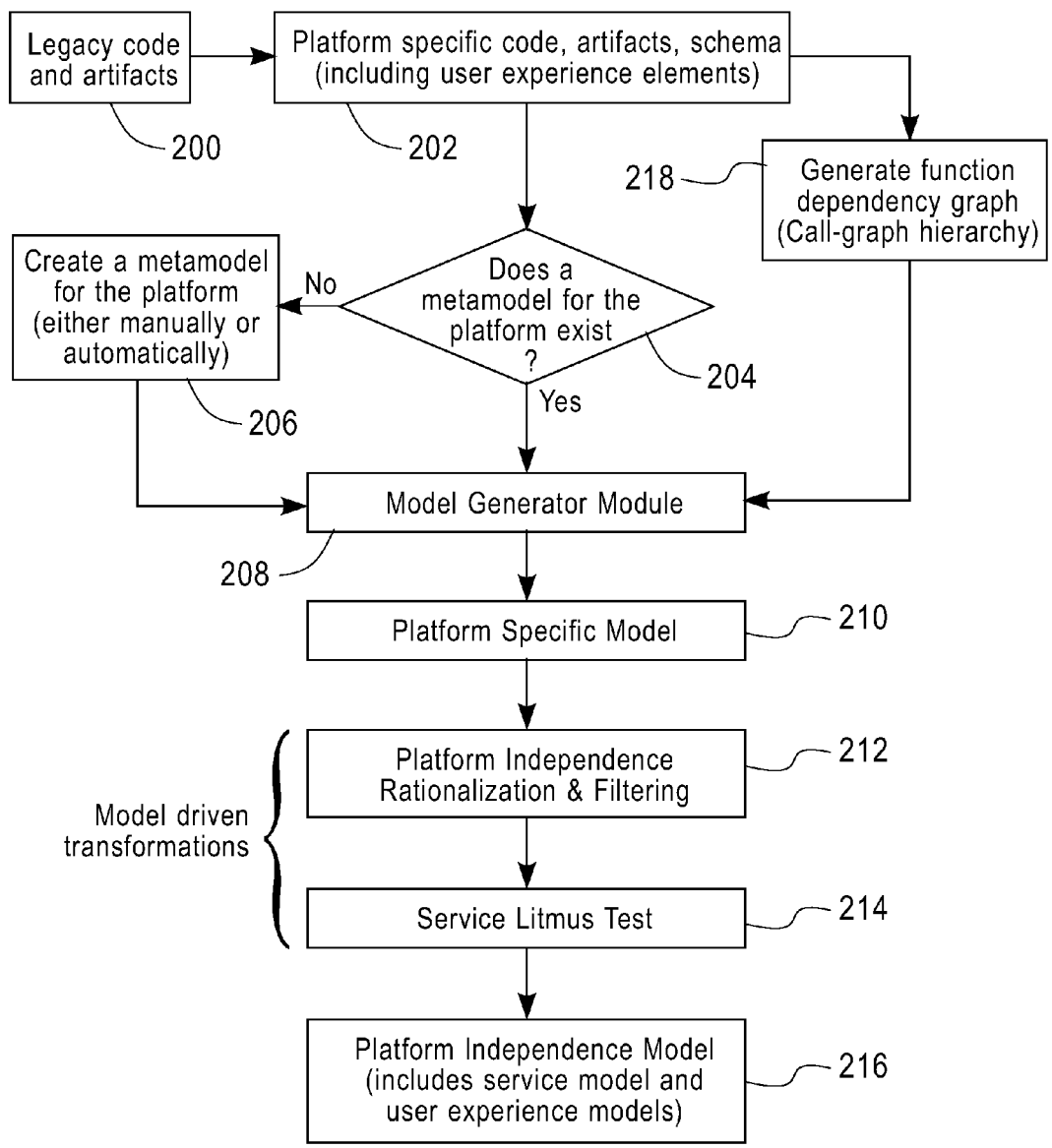
FIG. 2 is a more detailed flow diagram of an embodiment of the invention of FIG. 1.

FIG. 2 illustrates in more detail a flow diagram of an embodiment of the invention for converting platform specific artifacts into a platform independent model. The flow diagram may be implemented in software as modules or steps by a computer 1100 (FIG. 11), wherein the computer 1100 is described in more detail hereinafter. Platform specific legacy code and artifacts within a module 200, and platform specific code, artifacts, UI elements and schema (including user experience elements) within a module 202 are checked in a module or step 204 to determine whether or not a meta-model for the platform specific model exists. If no meta-model exists, a meta-model for the platform is created in a module or step 206. If a meta-model exists, then the implementation artifacts from the modules 200-202 are processed in a module or step 208 in a Model Generator Module to generate a platform specific model in a module 210. The platform specific legacy code, artifacts, UI elements, schema, etc. may be present in many forms and formats including code written in programming languages such as Java, or C, or C++ and schema and other artifacts represented as XML files or other files.

The Model Generator Module 208 processes the platform specific artifacts in their various formats and extracts a platform specific model from them. In order to do this, the Module has to know the meta-model of the underlying platform. If one exists, then the implementation artifacts can be mapped to such a platform specific model by the Module 208. But in cases where one does not exist, a platform specific model is derived or created in the module or step 206 from fully representative examples. This process of deriving or creating a platform specific model in the module 206 can be performed either automatically or manually or by a combination of both. Automatic creation of platform specific models is possible if the interfaces of the target platform implementation artifacts are homogenous and the exemplar from which the platform specific model is to be derived is complete. In this context an exemplar is considered complete if it consists of one instance of each kind of artifact that could possibly exist on that platform. Schema generation is then possible via known reverse engineering techniques from existing artifacts. Different vendor tools offer varying capabilities on this front to derive a meta-model automatically.

Once a platform specific model is obtained, it is rationalized and filtering is performed in a module or step 212 to extract only those elements that are of "value" at the platform independent level in an SOA environment. The rationalization and filtering mechanism can employ certain predefined rules to perform these functions. For example, models of artifacts such as factory classes for business objects, and auxiliary data structures and code that setup environment variables and connectivity with legacy systems, etc. need not be translated onto platform independent models. These types of business objects, data structures, application services, their operations are cleansed and filtered in this module 212. Then from the platform specific model, service models are extracted and applied a service litmus test in a module or step 214 (as given in SOMA method) to categorize services as process services, information services, security services, infrastructure services, etc. The SOMA method defines these categories of services. Each service along with its ecosystems of services can be examined in detail to derive this information either automatically or manually. Once done, additional tagging is performed on services to note which ones are exposed externally and which ones are internal implementations. The litmus test module 214 can be administered manually or can be automated if there is enough semantic information about the code/artifacts to know about the behavior and characteristics. This along with the user experience elements and models are all extracted into a platform independent model in a module or step 216 via model-driven transformations.

In addition one can generate a call-graph hierarchy on the platform specific code in a module or step 218 which gives out a report on which classes/functions are calling which other classes/functions. Several techniques have been proposed in literature on constructing call graph hierarchies. Embodiments of the invention are concerned with the results of call-graph hierarchy rather than constructing a call-graph hierarchy. This information is captured and reflected in the platform specific model by the Model Generator Module 208 which then gets translated into a platform independent model via model driven transformations. This helps generate a service dependency model at the platform independent model. The service model and the service dependency information together provide static and the dynamic models at the platform independent level.

Transformations create elements in a target model or domain based on elements from a source model. A model driven transformation is a set of mapping rules that define how elements in a given source model map to their corresponding elements in a target domain model. These rules are specified between the source and target platform meta-models. As shown in FIG. 1, depending on what needs to be generated there could e multiple levels of transformations such as model-to-model, model-to-text, and model-to-code.

Also, depending on the source and target platforms, multiple levels of transformations might be required to transform implementation artifacts to a PIM. For example, transformations may be required across models of the same type such as a transformation from one PSM to another PSM to add additional levels of refinement or across different levels of abstraction such as from PSM to PIM or from one type of model to another such as from code to PSM or even code to PIM. Traditional code to PSM and PSM to PIM transformations may be used, as shown in FIG. 1. Operationally, multiple levels of transformations can be chained so that the intermediate results are invisible to the consumer of the transformations.

As mentioned above, one of the precursors to defining transformations is the availability of meta-models of the source and target domains or platforms for which transformations need to be specified. Often one of the platforms is more abstract than the other. In an exemplary embodiment, a meta-model may be the meta-model of the elements expressed in UML 2.0, and the service level abstractions offered by the SOMA method and the created user experience model. If access to the meta-models of these elements is available, then the meta-model of the overlying model is relatively well understood.

One of the challenges in realizing the model driven transformations is knowing the meta-model of the various platforms. In cases where the implementation platforms are proprietary, extracting the meta-model of these platforms can be an engineering challenge. For example, the meta-models of SAP NetWeaver's WebDynPro and Guided Procedures modules are unpublished and are difficult to create without exemplars. Working with concrete models is more intuitive for most developers than to work with meta-models. Therefore, best practice suggests that an exemplar be created and then the meta-model is reverse engineered from the exemplar. An exemplar is an example solution that one would like the transformations to produce. This means that an exemplar has to be completed with at least one instance of all types of possible model elements. An exemplar could be a single XML file or a collection of code artifacts (such as java files) or a combination. In addition, creating an exemplar helps to obtain a picture of what needs to be produced. Once an exemplar is created, a meta-model can be extracted therefrom using various code-to-schema extraction tools.

In an embodiment of the invention, a simple instance of a business application that an IT services company may have relates to trade promotions management. Trade promotions are incentives paid by consumer products manufacturers to retailers for merchandising support. Typically, a key account manager creates trade promotions after deciding which products need to be promoted. To accomplish this, the manager establishes "promotion groups" comprising groupings of products to be promoted. Once the promotion offer details are finalized, the manager submits these trade promotions for approval to a trade marketing manager. The trade marketing manager has the overall responsibility to manage the calendar of trade promotions being offered to each retailer each month. The trade marketing manager reviews the trade promotions submitted by the key account manager for a given retailer and approves or rejects the trade promotions as the case may be. Usually, computer implementation of a trade promotion involves multiple parties and integration of many systems. These systems are often implemented by different vendors on different platforms. For example, a service that retrieves a list of all available products for promotion offering may be available on a client's SAP ERP system. With the trade promotions management solution deployed at the client site, the trade promotions management solution is integrated with the appropriate system interfaces of the SAP system. However, each client's environment may differ from one another in that another client may have some other system for offering the same function. In addition, some clients might prefer their solutions be on specific development and corresponding runtime platforms such as the IBM WebSphere, Oracle/BEA, and SAP NetWeaver platforms for a number of reasons including the availability of in-house skills for project development and maintenance, availability of software licenses, and feature preference of the software. Therefore, IT services companies are faced with the challenge of dealing with multiple client legacy systems, the details of which may not be known upfront.

Figure 3A:
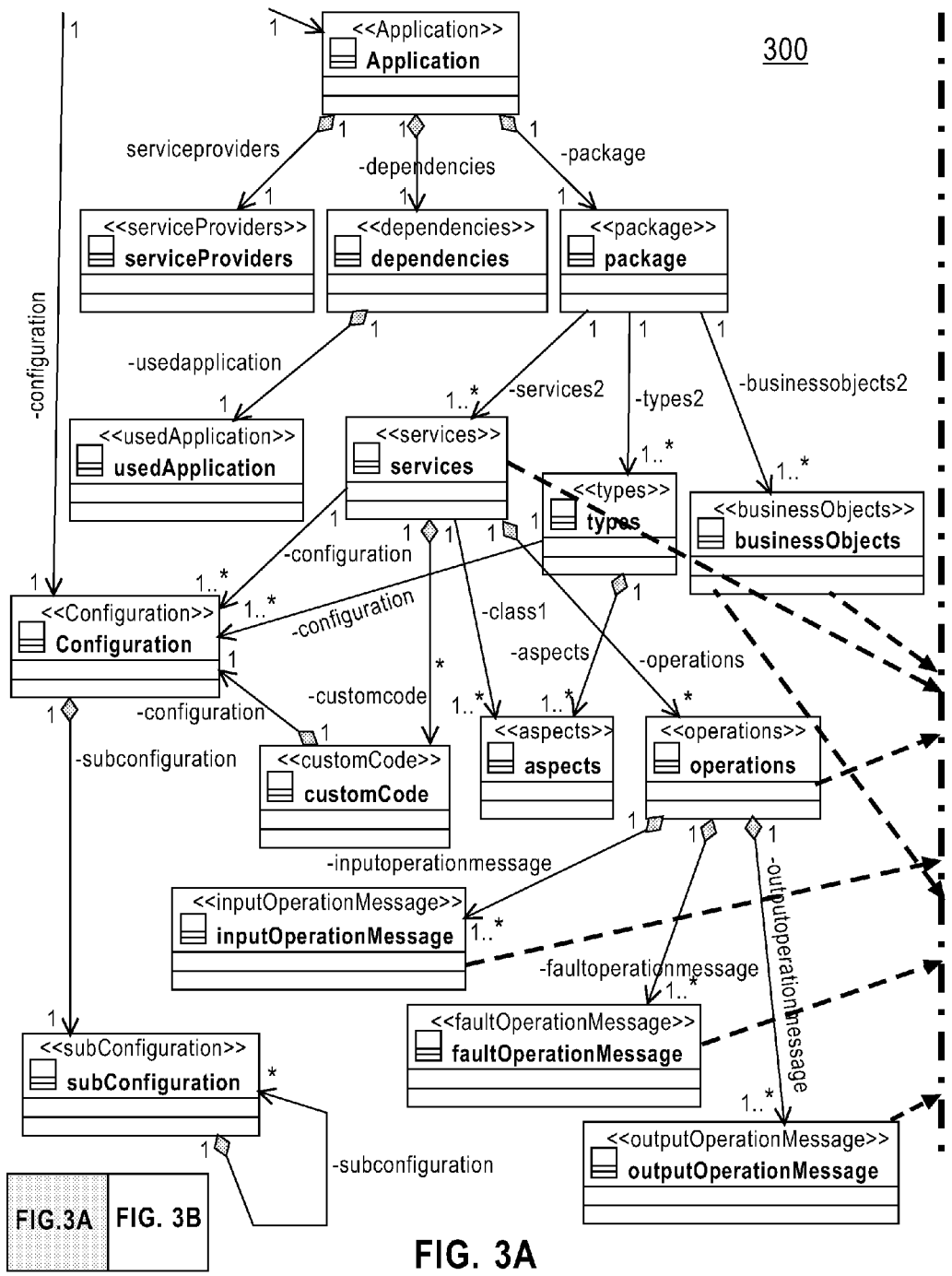
FIG. 3 shows the transformation mappings between the service elements of the meta-models of the SAP Composite Application Framework (CAF) PSM and the PIM, wherein the SAP CAF is an exemplar PSM used to illustrate the PSM-to-PIM transformations.
Figure 3B:
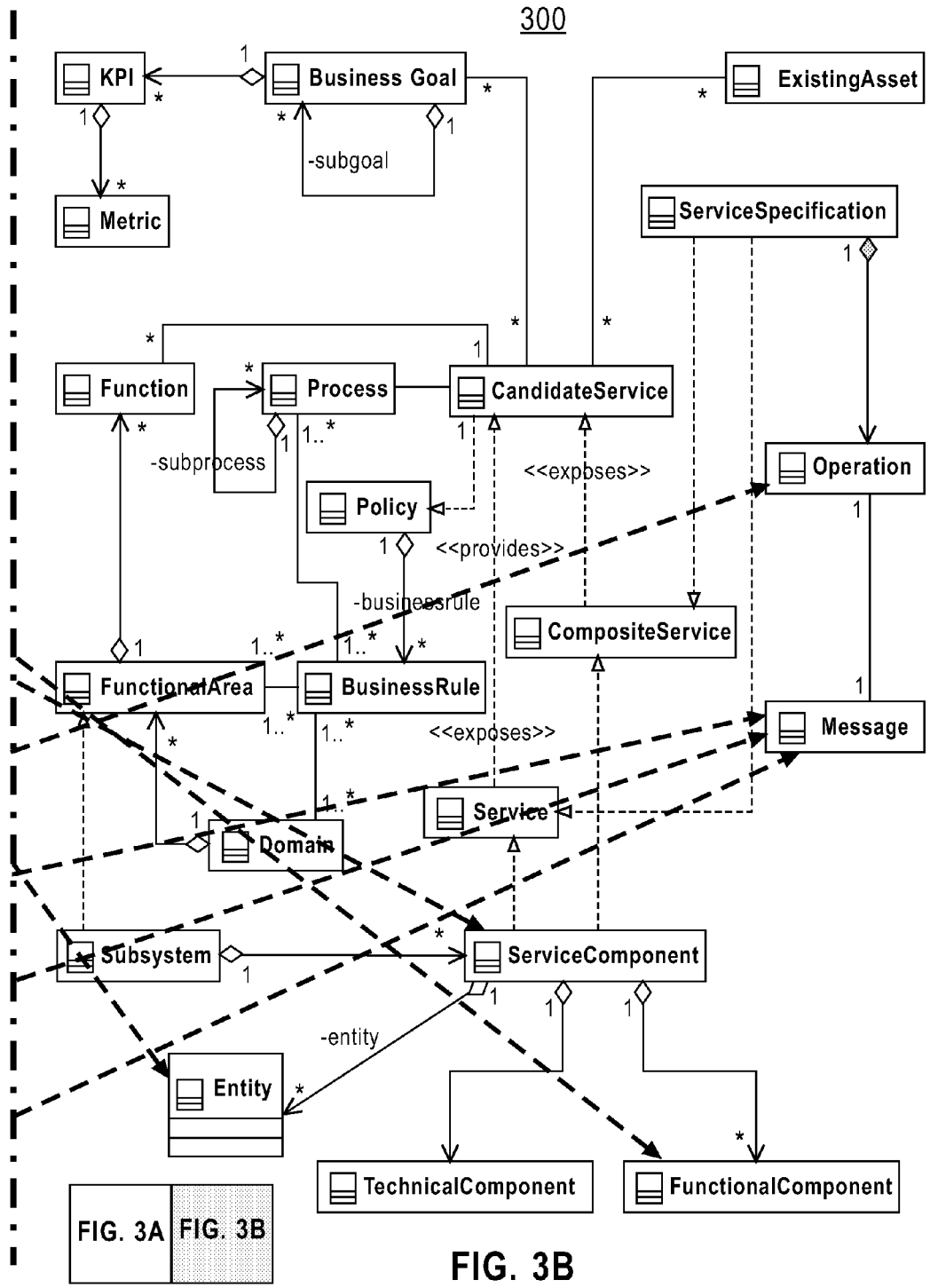
Figure 4A:
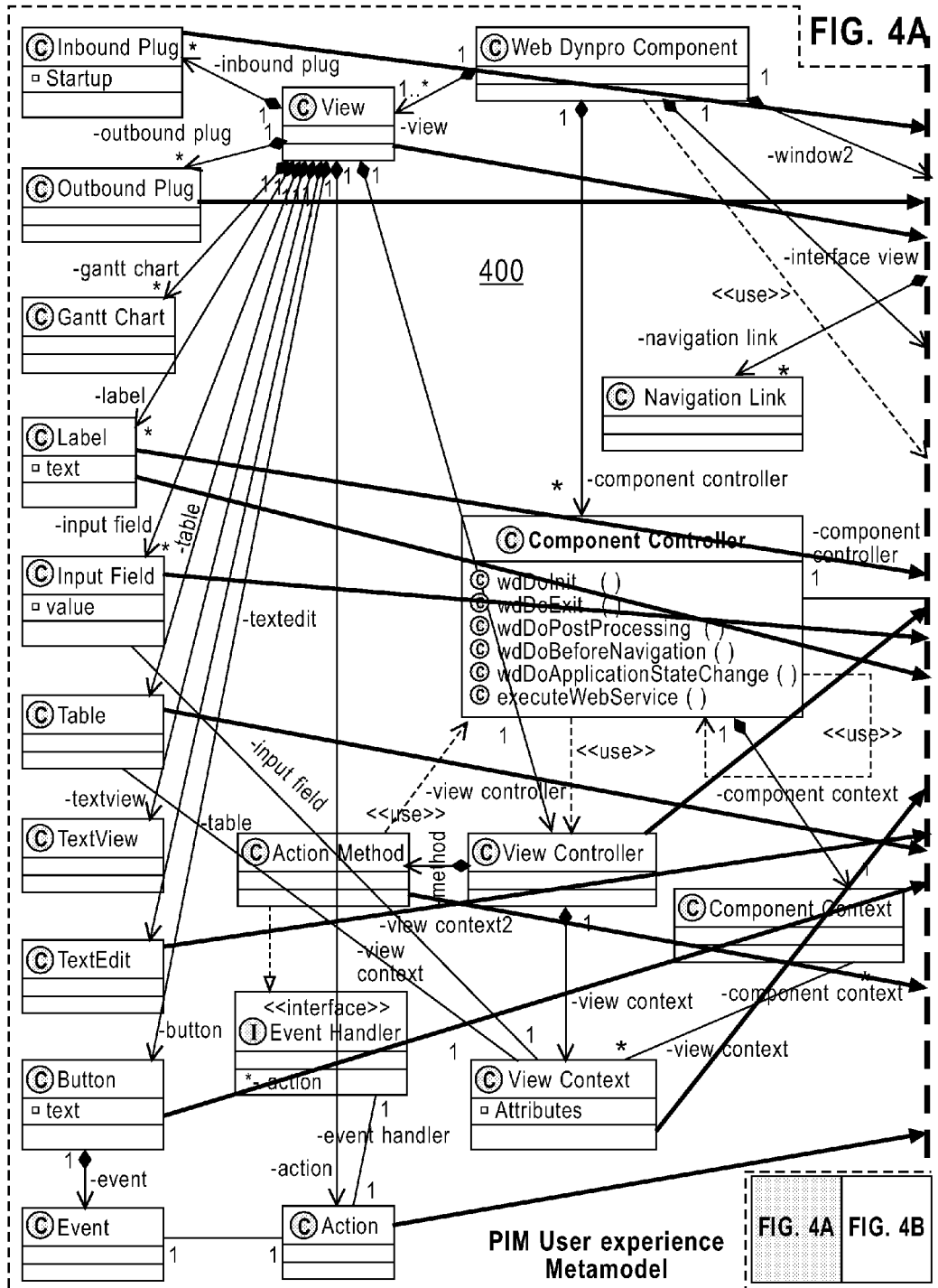
FIG. 4 shows the transformation mappings between the SAP NetWeaver WebDynPro module PSM and the user experienced PIM.
Figure 4B:
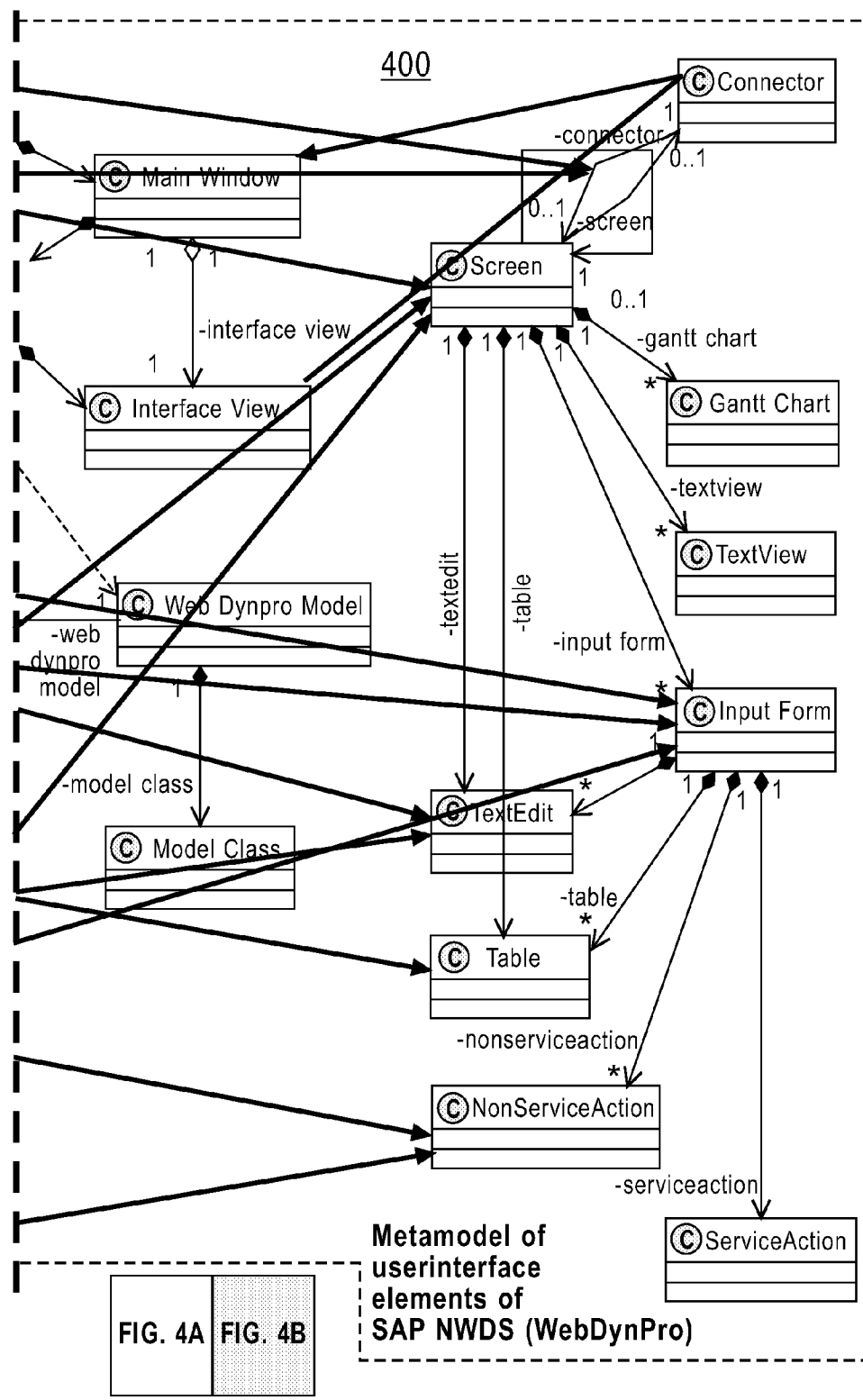

In accordance with the exemplary embodiment of the present invention, FIGS. 3 and 4 illustrate the transformation rules between the meta-model of the PSM, developed, for example, in the SAP NetWeaver composite application framework (CAF), and the meta-model of the PIM. Specifically, FIG. 3 shows the transformation mappings 300 between the service elements of the meta-models of the SAP CAF PSM and the PIM. FIG. 4 shows the transformation mappings 400 between the SAP NetWeaver WebDynPro module (i.e., the PSM) and the user experienced PIM. These transformation mapping rules may be developed, for example, using the IBM RSA transformation authoring tool. The transformation rules may be developed manually through observation and domain analysis. Automated ways of deriving transformation rules are being researched.

Figure 5:
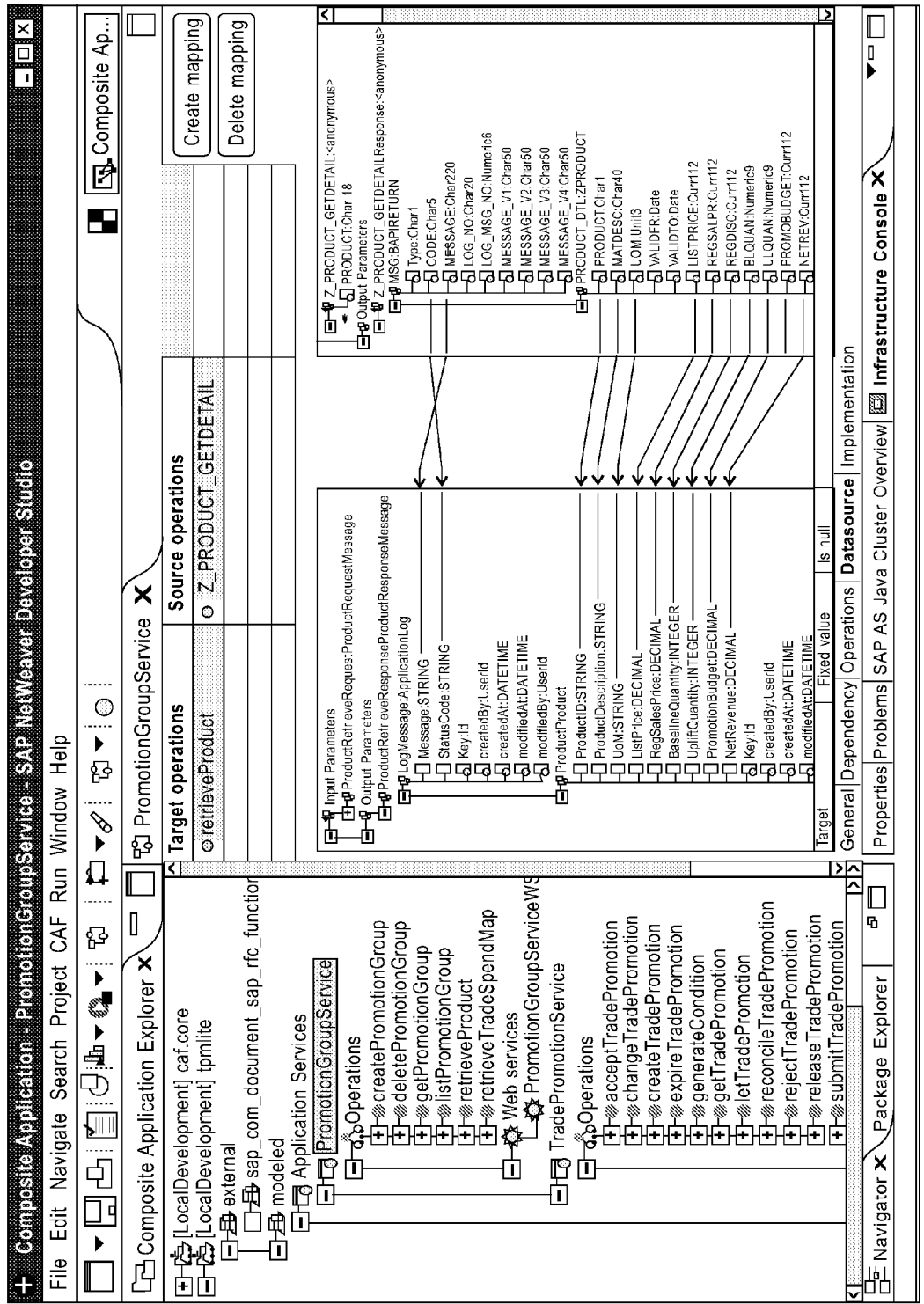
FIG. 5 shows the implementation artifacts of the composite application for the exemplary trade promotions scenario developed using the SAP NetWeaver tool.
Figure 6:
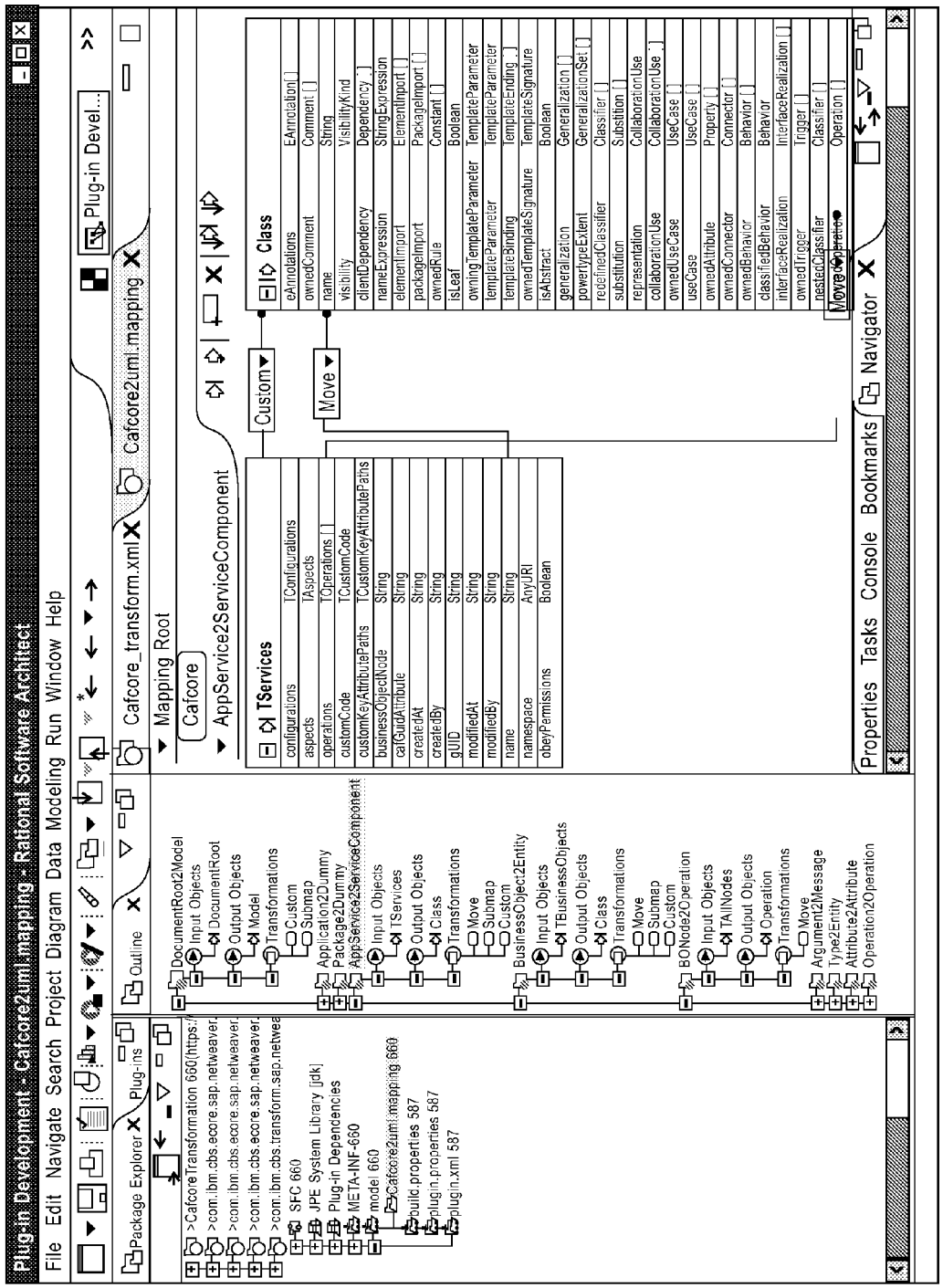
FIG. 6 shows the mappings from the SAP NW CAFCore PSM into the PIM of FIG. 1.
Figure 7:
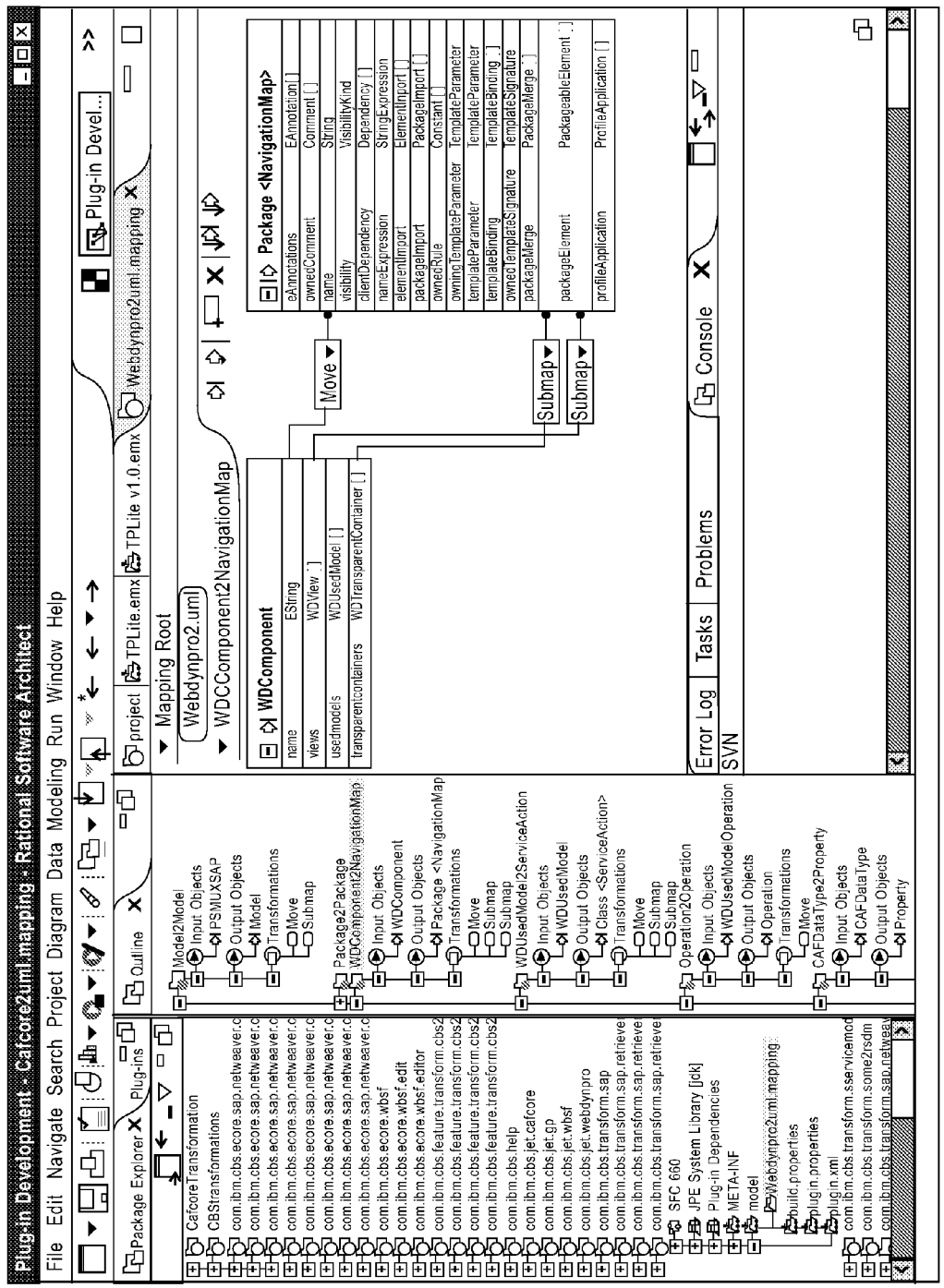
FIG. 7 shows the mappings from the SAP NW WebDynPro PSM into the PIM of FIG. 1.

FIG. 5 illustrates the composite application for the exemplary trade promotions scenario developed using the SAP NetWeaver tool. Specifically, FIG. 5 illustrates the visual model of the implementation artifacts (i.e., the code, XML files) 100 in the block diagram of FIG. 1 of the exemplary trade promotions embodiment of the present invention. It is the representation artifacts of the visual model shown that will undergo the code to model ("reverse") transformations to generate the PSM 102 of FIG. 1. In addition, FIG. 6 illustrates the reverse mappings from the SAP NW CAFCore PSM 102 into the PIM 104 of FIG. 1, while FIG. 7 illustrates the reverse mappings from the SAP NW WebDynPro PSM 102 into the PIM 104 of FIG. 1.

Figure 8:
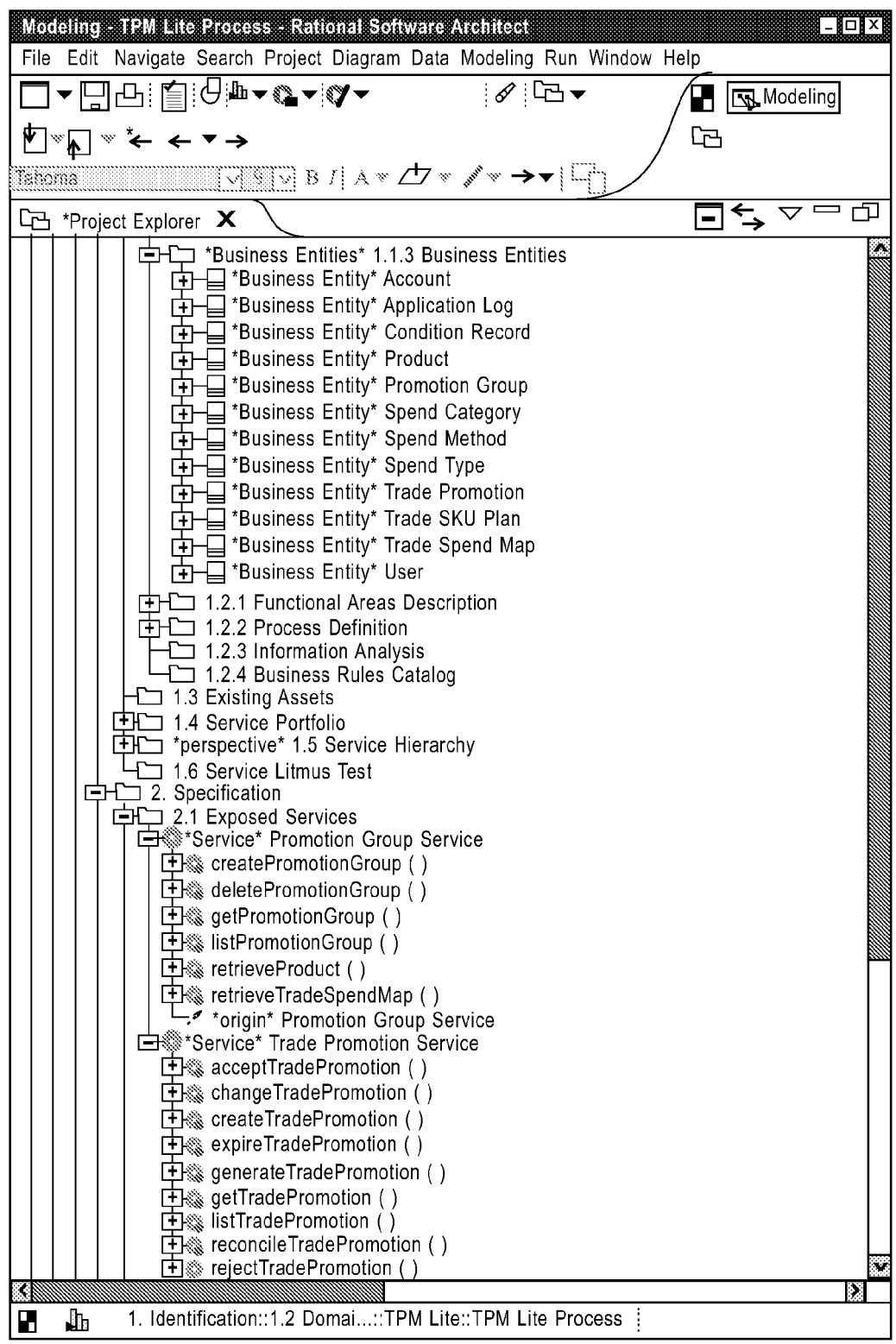
FIG. 8 shows the generated business entities, services and their interfaces.
Figure 9:
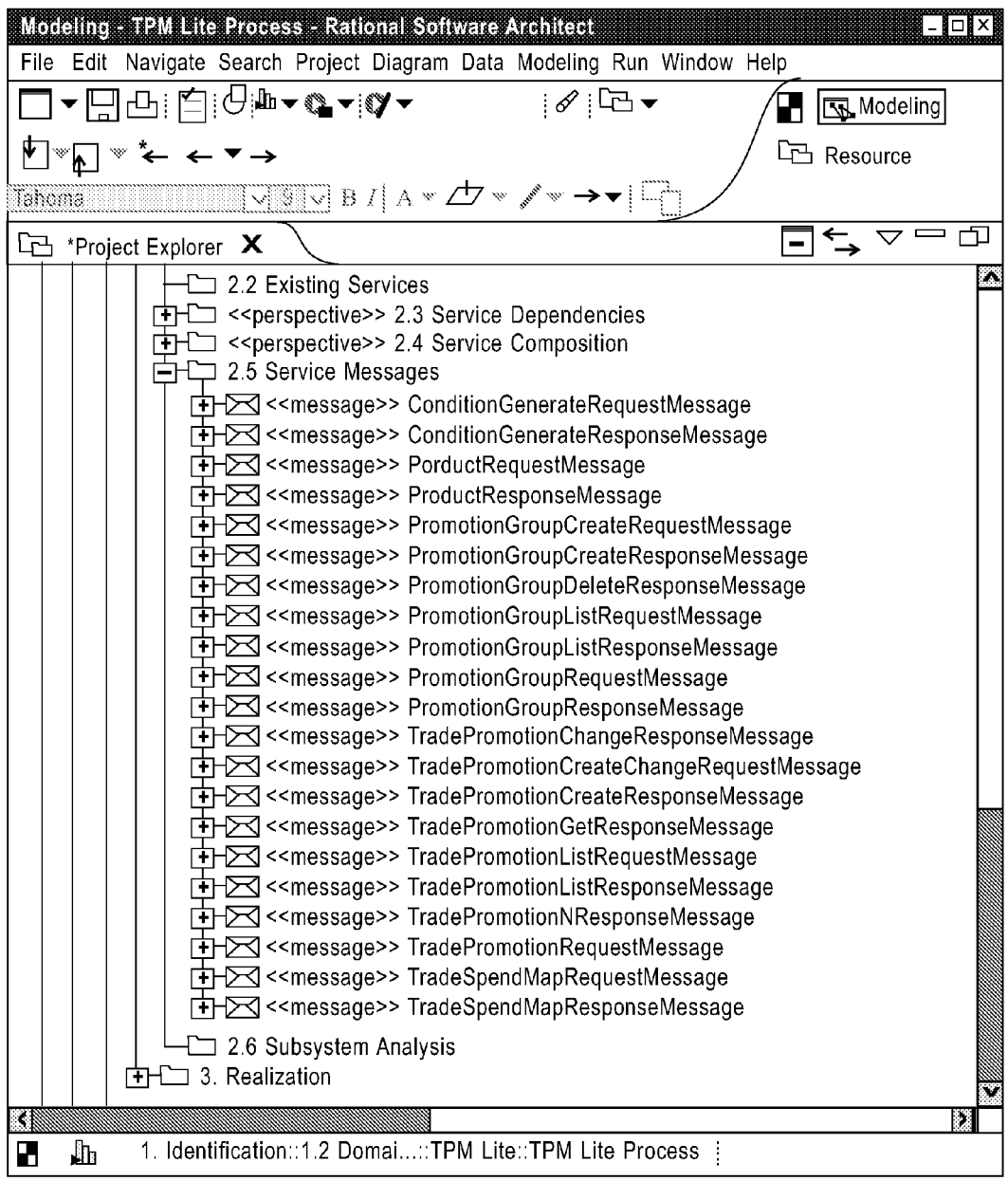
FIG. 9 shows the generated message objects that are exchanged via the service interface.
Figure 10:
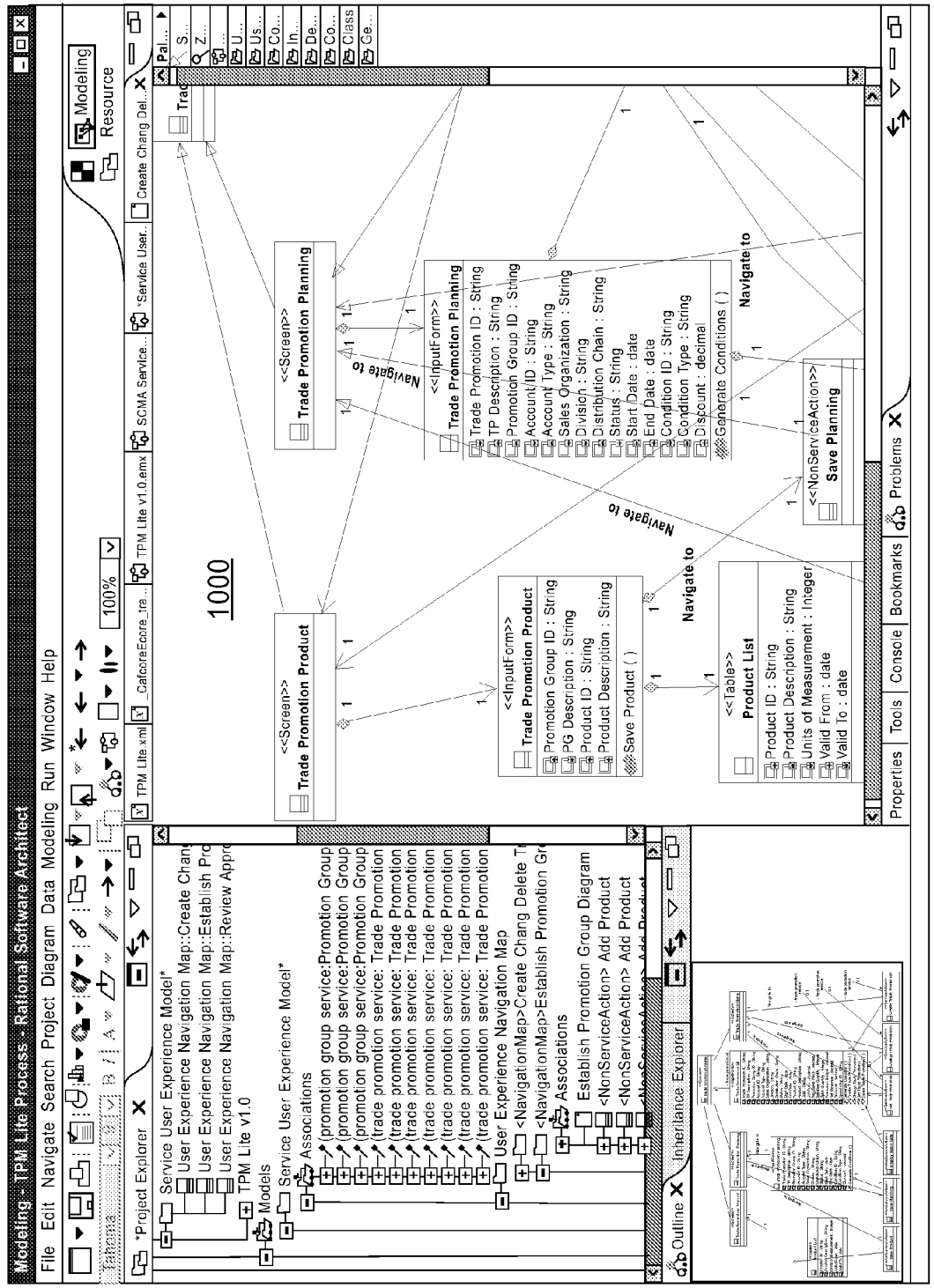
FIG. 10 shows the generated user experience PIM of the trade promotions management scenario modeled using the vocabulary defined in the user experience profile.

FIGS. 8 and 9 illustrate the output of the reverse transformations. These are the outputs of service identification via process decomposition step in the SOMA method—a substep of the Platform Independent Rationalization and Filtering step in FIG. 2. As noted earlier, candidate services discovered via process decomposition are passed through a service litmus test according to the SOMA specification. Some of the candidate services may be deemed too low level during this phase and, as a result, are delegated to lower level technical or functional components while the remaining services are exposed as services. Specifically, FIG. 8 shows the business entities, services and their interfaces derived for the exemplar 800 described above. FIG. 9 shows the messages 800 that are exchanged via the service interfaces of exposed services. FIG. 10 shows the user experience PIM 1000 of the trade promotions management scenario modeled using the vocabulary defined in the user experience profile.

In general, extracting the meta-models for non-standards based and proprietary platforms is an engineering challenge. Depending on the platform, varying amounts of manual effort may be required to extract the meta-modal of the platform. If the meta-models are not published or not accessible, then one may have to resort to manual observation of exemplars to derive the meta-model from the exemplar. This means an exemplar with all possible types of elements needs to be constructed. The meta-model extraction may be automated. Some tool vendors including IBM's Rational Software Architect (RSA) provide exemplar analysis tools to investigate and extract meta-models from exemplars.

Figure 11:
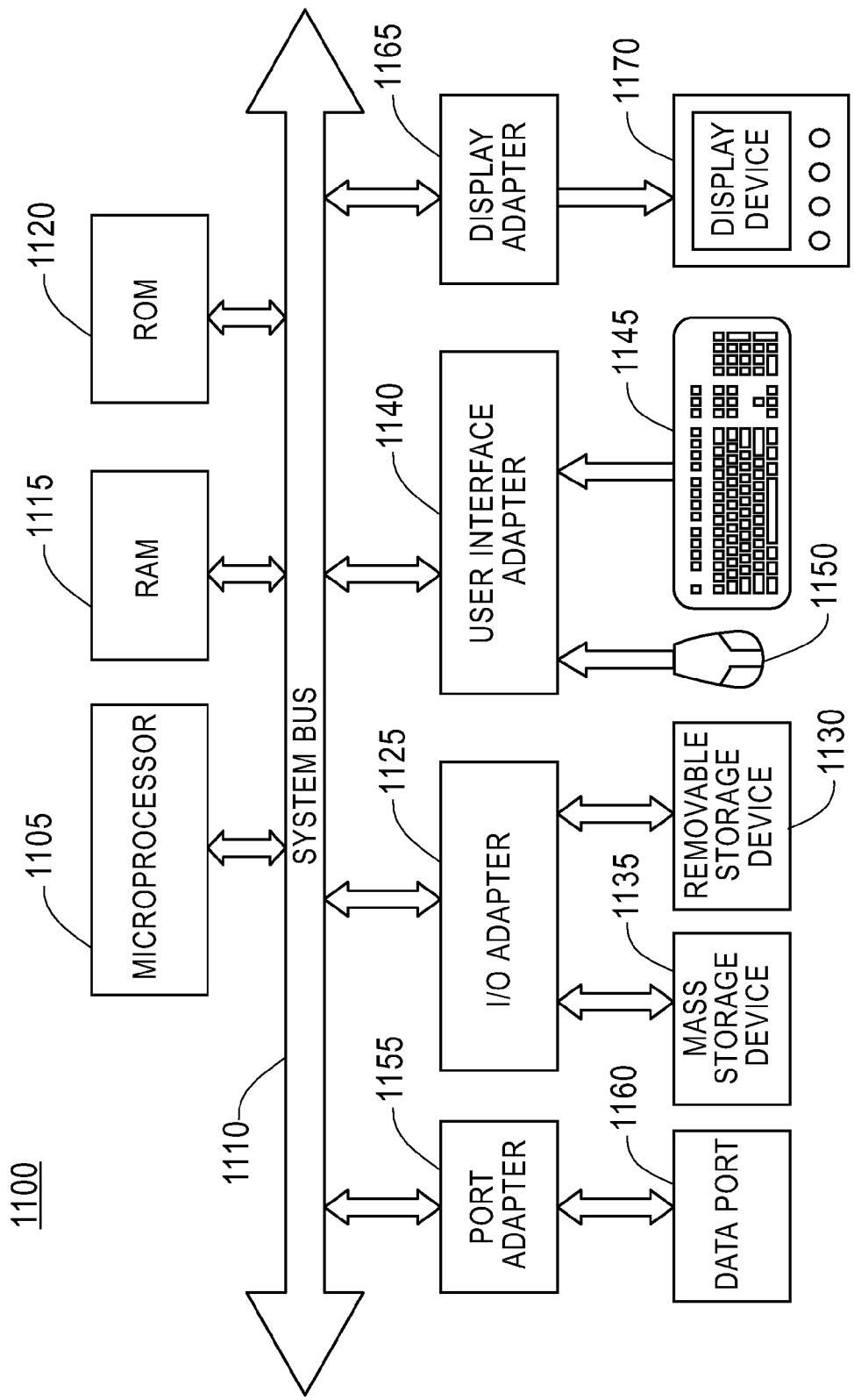
FIG. 11 is a schematic block diagram of a general-purpose computer suitable for practicing embodiments of the present invention.

Generally, the method embodiments for implementing the extracting of platform independent models from composite applications may be practiced with a general-purpose computer and the method may be coded as a set of instructions on removable or hard media for use by the general-purpose computer. FIG. 11 is a schematic block diagram of a general-purpose computer suitable for practicing embodiments of the present invention. In FIG. 11, computer system 1100 has at least one microprocessor or central processing unit (CPU) 1105. CPU 1105 is interconnected via a system bus 1110 to a random access memory (RAM) 1115, a read-only memory (ROM) 1120, an input/output (I/O) adapter 1125 for connecting a removable data and/or program storage device 1130 and a mass data and/or program storage device 1135, a user interface adapter 1140 for connecting a keyboard 1145 and a mouse 1150, a port adapter 1155 for connecting a data port 1160 and a display adapter 1165 for connecting a display device 1170.

ROM 1120 contains the basic operating system for computer system 1100. The operating system may alternatively reside in RAM 1115 or elsewhere as is known in the art. Examples of removable data and/or program storage device 1130 include magnetic media such as floppy drives and tape drives and optical media such as CD ROM drives. Examples of mass data and/or program storage device 1135 include hard disk drives and non-volatile memory such as flash memory. In addition to keyboard 1145 and mouse 1150, other user input devices such as trackballs, writing tablets, pressure pads, microphones, light pens and position-sensing screen displays may be connected to user interface 1140. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 1130, fed through data port 1160 or typed in using keyboard 1145.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1 and 2.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method executed by a central processing unit (CPU) for extracting a platform independent model (PIM) from a composite application, the method comprising:
    identifying existing implementation artifacts of the composite application, wherein the implementation artifacts comprise platform specific legacy code and artifacts;
    transforming the identified implementation artifacts for generating a platform specific model (PSM), wherein generating a PSM includes one or more transformations between the implementation artifacts and one or more meta-models of the PSM; and
    transforming the PSM for generating a PIM, wherein generating a PIM includes one or more transformations between the one or more meta-models of the PSM and one or more meta-models of the PIM;
    wherein one or more transformations between elements of the one or more meta-models of the PSM and elements of the one or more meta-models of the PIM include one or more mappings that define rules for mapping between the elements of the one or more meta-models of the PSM and the elements of the one or more meta-models of the PIM.

2. The method of claim 1, wherein the implementation artifacts further comprise code, data base schema, user experience modules, and/or workflow engines.

3. The method of claim 1, wherein at least a portion of the existing implementation artifacts are wrapped as one or more of the services along with associated metadata to thereby facilitate reuse of the at least a portion of the existing implementation artifacts.

4. The method of claim 3, wherein the services have formal linkages with business objectives thereby providing traceability between derived services and business objectives served by the services.

5. The method of claims 1, wherein the generated PIM includes a service model, service dependency model, structural model, behavioral model, and/or a user experience model of the composite application.

6. The method of claim 5, wherein each service in the service model exposes its interface signature, message exchanges and any associated metadata.

7. The method of claim 1, wherein when at least one or more meta-models of an existing platform are unknown, further comprising deriving a meta-model of the existing platform either manually or automatically or using exemplar analysis techniques.

8. The method of claim 1, wherein the PIM is created in one of a plurality of formal modeling languages of a group that comprises the Unified Modeling Language (UML), the Resource Description Framework (RDF), or the Extensible Markup Language (XML).

9. The method of claim 1, wherein the elements of the meta-models include service elements from the group that comprises service operations, service messages, service interfaces, business objects and data structures.

10. The method of claim 1, wherein the elements of the meta-models include user experience elements from the group that comprises screens, input forms, text fields, tables, graphs, tabbed views, service actions, non-service actions.

11. The method of claim 1, wherein the mappings between the PIM and the PSM are created manually.

12. The method of claim 1, wherein the mappings between the PIM and the PSM are derived via ontology mapping techniques.

13. The method of claim 1, wherein the generated PSM is rationalized and filtered to extract certain elements of the generated PSM that have value to the generated PIM.

14. The method of claim 13, further comprising extracting service models from the generated PSM.

15. The method of claim 14, further comprising applying a litmus test to the extracted service models to categorize services within the service models as process services, information services, security services or infrastructure services.

16. The method of claim 1, wherein a dependency between various functional modules is derived from the implementation artifacts and is captured as service dependencies and behavioral model in the PSM which is then further transformed into the PIM.

17. The method of claim 16, wherein a dependency between the various functional modules is derived manually, automatically or semi-automatically using call-graph hierarchy generation techniques.

18. A system having a processor for extracting a platform independent model (PIM) from a composite application, comprising:
    a computing network including a processing device in communication with one or more computer memory storage devices;
    a module that identifies existing implementation artifacts of the composite application, wherein the implementation artifacts comprise platform specific legacy code and artifacts;
    a module that transforms the identified implementation artifacts for generating a platform specific model (PSM), wherein generating a PSM includes one or more transformations between the implementation artifacts and one or more meta-models of the PSM; and
    a module that transforms the PSM into a PIM, wherein the PIM includes one or more transformations between the one or more meta-models of the PSM and one or more meta-models of the PIM;
    wherein one or more transformations between elements of the one or more meta-models of the PSM and elements of the one or more meta-models of the PIM include one or more mappings that define rules for mapping between the elements of the one or more meta-models of the PSM and the elements of the one or more meta-models of the PIM.

19. The system of claim 18, further comprising a module that rationalizes and filters certain extracted elements of the PSM that have value to the PIM.

20. The system of claim 18, further comprising a module that applies a litmus test to service models extracted from the PSM to categorize services within the service models as process services, information services, security services or infrastructure services.

21. The system of claim 18, further comprising a call-graph hierarchy generation module that derives a dependency between various functional modules either manually, automatically or semi-automatically using call-graph hierarchy generation techniques.

22. The system of claim 18, further comprising a module that includes existing implementation artifacts of the composite application.

23. The system of claim 18, further comprising a module that derives a meta-model of the existing platform either manually or automatically or using exemplar analysis techniques when at least one or more meta-models of an existing platform are unknown.

24. A computer program product, comprising:
- a non-transitory computer readable medium storing computer program code for extracting a platform independent model (PIM) from a composite application; and
- instructions for causing a computer to implement a method, the method further including:
- identifying existing implementation artifacts of the composite application, wherein the implementation artifacts comprise platform specific legacy code and artifacts;
- transforming the identified implementation artifacts for generating a platform specific model (PSM), wherein generating a PSM includes one or more transformations between the implementation artifacts and one or more meta-models of the PSM; and
- transforming the PSM for generating a PIM, wherein generating a PIM includes one or more transformations between the one or more meta-models of the PSM and one or more meta-models of the PIM;
- wherein one or more transformations between elements of the one or more meta-models of the PSM and elements of the one or more meta-models of the PIM include one or more mappings that define rules for mapping between the elements of the one or more meta-models of the PSM and the elements of the one or more meta-models of the PIM.

* * * * *